US012644413B2

(12) United States Patent
Frost

(10) Patent No.: US 12,644,413 B2
(45) Date of Patent: Jun. 2, 2026

(54) SYSTEM FOR COOLING COMPONENTS ASSOCIATED WITH GAS TURBINE ENGINE

(71) Applicant: ROLLS-ROYCE plc, London (GB)

(72) Inventor: Warren Frost, Derby (GB)

(73) Assignee: ROLLS-ROYCE PLC, London (GB)

( * ) Notice: Subject to any disclaimer, the term of this patent is extended or adjusted under 35 U.S.C. 154(b) by 59 days.

(21) Appl. No.: 18/882,859

(22) Filed: Sep. 12, 2024

(65) Prior Publication Data

US 2025/0122838 A1     Apr. 17, 2025

(30) Foreign Application Priority Data

Oct. 11, 2023     (GB) ...................................... 2315574

(51) Int. Cl.
  *F02C 7/18*      (2006.01)
  *F02C 6/08*      (2006.01)
  *F02C 9/18*      (2006.01)

(52) U.S. Cl.
  CPC .................. *F02C 7/18* (2013.01); *F02C 6/08* (2013.01); *F02C 9/18* (2013.01); *F05D 2260/232* (2013.01); *F05D 2260/606* (2013.01)

(58) Field of Classification Search
  CPC ...... F02C 7/12; F02C 7/14; F02C 7/18; F02C 7/185; F02C 9/18; F02C 6/08
  See application file for complete search history.

(56) References Cited

U.S. PATENT DOCUMENTS 4,441,314 A * 4/1984 Fitton ...................... F01D 11/24
                                                     60/266
5,012,639 A * 5/1991 Ream ...................... B64D 29/00
                                                     60/39.83
8,904,753 B2 * 12/2014 Murphy .................. F02C 7/185
                                                     165/96
10,174,681 B2 * 1/2019 Beecroft ............... F04D 27/023
10,724,431 B2 * 7/2020 Munsell ................... F02C 6/08
2009/0056342 A1 3/2009 Kirzhner (Continued)

FOREIGN PATENT DOCUMENTS

EP        3 489 467 A2    5/2019
EP        3 290 659 B1    3/2022
WO        92/11444 A1     7/1992

OTHER PUBLICATIONS

Mar. 21, 2024 Search and Examination Report issued in British Patent Application No. GB2315574.0.

*Primary Examiner* — Thuyhang N Nguyen
(74) *Attorney, Agent, or Firm* — Oliff PLC

(57)     ABSTRACT

A system for cooling one or more components associated with a gas turbine engine includes a main duct, a first duct that receives and directs a portion of airflow from the main duct towards a core zone cooling arrangement of the gas turbine engine, and a second duct that receives and directs a portion of the airflow from the main duct towards a turbine case cooling arrangement or an oil cooling unit of the gas turbine engine. The system includes a valve unit including a first valve member disposed in the first duct and a second valve member disposed in the second duct. The first and second valve members control a fluid flow through the first and second ducts, respectively. The system includes at least one controller configured to control the valve unit to modulate the portion of the airflow through each of the first and second ducts.

20 Claims, 11 Drawing Sheets

(56)           References Cited

U.S. PATENT DOCUMENTS

2013/0098046 A1*   4/2013   Suciu ........................ F02C 7/08
                                                                  60/39.23
2017/0167273 A1*   6/2017   Maguire ................. F01D 11/24
2023/0143283 A1*   5/2023   Sharma ................... F01D 11/24
                                                                  415/173.2

* cited by examiner

SYSTEM FOR COOLING COMPONENTS ASSOCIATED WITH GAS TURBINE ENGINE

CROSS-REFERENCE TO RELATED APPLICATIONS

This specification is based upon and claims the benefit of priority from UK Patent Application Number 2315574.0 filed on Oct. 11, 2023, the entire contents of which are incorporated herein by reference.

BACKGROUND

1. Field of the Disclosure

The present disclosure relates to a gas turbine engine, and in particular, to a system for cooling components associated with the gas turbine engine.

2. Description of the Related Art

Gas turbine engines employ cooling arrangements to maintain a temperature of components associated with the gas turbine engine within desired limits and also to control expansion of the components. Typically, such cooling arrangements include means that allow air to be directed towards one or more components of the gas turbine engine. Such cooling arrangements may be associated with, for example, an engine core, a turbine case, and/or an oil cooling unit of the gas turbine engine.

Typically, the cooling arrangements include one or more fixed ventilation ducts that receive and direct the air to the respective components. An amount of air required for cooling the components may vary, for example, based on operating conditions of the gas turbine engine. In some examples, the fixed ventilation ducts may provide cooling air flow to core zone components of the gas turbine engine. Such fixed ventilation ducts are sized to assure a minimum air flow in every flight condition, in particular at idle/engine low power conditions, resulting in excess air flow at engine high power conditions. In order to provide sufficient amount of air flow to the core zone components at all engine power conditions, the cooling system is typically over-dimensioned i.e., the fixed ventilation ducts may have to be built of a large size to guarantee a minimum volume change per minute (VCPM), which may result in a reduction of overall powerplant efficiency. Specifically, during engine high power conditions, the large-sized, fixed ventilation ducts associated with the core zone may receive excess air flow from, for example, a bypass duct of the gas turbine engine, even when not necessary, which may have an undesirable impact on the specific fuel consumption and may reduce an efficiency of the gas turbine engine.

SUMMARY

In a first aspect, there is provided a system for cooling one or more components associated with a gas turbine engine. The system includes a main duct configured to receive an airflow for cooling the one or more components associated with the gas turbine engine. The system further includes a first duct disposed in fluid communication with the main duct. The first duct is configured to receive and direct a portion of the airflow from the main duct towards a core zone cooling arrangement of the gas turbine engine. The system further includes a second duct separate from the first duct and disposed in fluid communication with the main duct. The second duct is configured to receive and direct a portion of the airflow from the main duct towards at least one of a turbine case cooling arrangement of the gas turbine engine and an oil cooling unit of the gas turbine engine. The system further includes a valve unit including a first valve member disposed in the first duct and a second valve member disposed in the second duct. The first valve member is configured to control a fluid flow through the first duct. The second valve member is configured to control a fluid flow through the second duct. The system further includes at least one controller communicably coupled with the valve unit. The at least one controller is configured to control the valve unit to modulate the portion of the airflow through each of the first duct and the second duct.

The airflow being directed towards the core zone cooling arrangement and at least one of the turbine case cooling arrangement and the oil cooling unit may help to maintain a temperature of the components within desired/acceptable limits and may also control a thermal expansion of the components. The controller of the system may control the valve unit to direct a desired amount of the airflow to the core zone cooling arrangement and at least one of the turbine case cooling arrangement and the oil cooling unit, respectively, based on operating conditions of the gas turbine engine. Thus, the system may ensure that sufficient amount of the airflow is being directed towards the components of the gas turbine engine, thereby providing sufficient cooling, and reducing noise generation. Further, the system ensures that, during engine low power conditions, the core zone cooling arrangement may be provided with increased amounts of the cooling air flow that is not being used by the turbine case cooling arrangement, due to which a fixed flow duct associated with the core zone cooling arrangement can be reduced in size. Furthermore, the system may improve an efficiency of the gas turbine engine. Specifically, during engine high power conditions, the system may reduce an amount of air flow being drawn through the compressors, the bypass duct, and/or the cabin blower unit of the gas turbine engine for providing cooling of the core zone cooling arrangement 106.

The core zone cooling arrangement may direct the airflow towards the engine core to cool the components within the engine core, for example, a compressor, a combustor, and the like. The first duct receives the airflow from the main duct and directs the desired amount of airflow towards the core zone cooling arrangement in order to prevent overheating of the components within the engine core. In some examples, the controller may control the valve unit to direct an increased amount of airflow towards the core zone cooling arrangement during high power manoeuvres, such as take-off, to prevent the components within the engine core from overheating.

In some examples, the turbine case cooling arrangement may direct the airflow towards a turbine case of the gas turbine engine to cool turbines mounted within the turbine case. The second duct receives the airflow from the main duct and directs the desired amount of airflow towards the turbine case cooling arrangement in order to prevent overheating of the turbines of the gas turbine engine. In some examples, the controller may control the valve unit to direct an increased amount of airflow towards the turbine case cooling arrangement during cruise conditions and stabilized conditions. Further, the controller may control the valve unit to direct minimum or no airflow during engine low power conditions.

In other examples, the system may allow the second duct to direct the airflow towards the oil cooling unit. The oil cooling unit may be used to maintain a temperature of oil, such as lubricant oil, that may be directed towards various components of the gas turbine engine. Overall, the system described herein may be simple and cost-effective to incorporate in gas turbine engines, may maintain the efficiency of the gas turbine engine, may reduce thermal expansion of components, and may reduce noises generated from the gas turbine engine during operation thereof.

In some embodiments, the valve unit includes a three-way valve configured to modulate the portion of the airflow through each of the first duct and the second duct. Thus, the single three-way valve may modulate the airflow to each of the core zone arrangement and/or at least one of the turbine case cooling arrangement and the oil cooling unit.

In some embodiments, the valve unit includes the first valve member, the second valve member, and a connecting rod assembly that connects the first valve member with the second valve member. The connecting rod assembly may translate a movement of one of the first and second valve members to the other of the first and second valve members.

In some embodiments, the first duct is inclined to the second duct by an inclination angle. The at least one controller controls one of the first valve member and the second valve member. The other of the first valve member and the second valve member is actuated by the connecting rod assembly based on an actuation of the one of the first valve member and the second valve member by the at least one controller. In a first configuration of the valve unit, the first valve member is fully open to allow the fluid flow through the first duct and the second valve member is fully closed to block the fluid flow through the second duct. In a second configuration of the valve unit, the first valve member is fully closed to block the fluid flow through the first duct and the second valve member is fully open to allow the fluid flow through the second duct. In a third configuration of the valve unit, each of the first valve member and the second valve member is partially open.

Thus, the at least one controller may control the valve unit so that the valve unit may be operated in three different configurations based on the cooling requirements of the core zone arrangement and at least one of the turbine case cooling arrangement and the oil cooling unit.

In some embodiments, the connecting rod assembly includes a first rod pivotally connected to the first valve member, a second rod pivotally connected to the second valve member, and a main rod pivotally connected to each of the first rod and the second rod.

The first rod, the second rod, and the main rod of the connecting rod assembly may form a 3-bar linkage that may allow simultaneous actuation of both the first and second valve members, even when only one of the first and second valve members is directly controlled by the controller.

In some embodiments, the at least one controller includes a first controller and a second controller. The first controller is configured to control the valve unit based on the cooling requirement of the core zone cooling arrangement. The second controller is configured to control the valve unit based on the cooling requirement of at least one of the turbine case cooling arrangement and the oil cooling unit. Each of the first controller and the second controller may control the first valve member or the second valve member to meet the cooling requirements of the components of the gas turbine engine, which may in turn increase the efficiency of the gas turbine engine.

In some embodiments, the at least one controller includes a single controller configured to control the valve unit based on the cooling requirement of the core zone cooling arrangement and the cooling requirement of at least one of the turbine case cooling arrangement and the oil cooling unit. The single controller may control the first valve member or the second valve member to modulate the airflow in the first duct and the second duct, respectively.

In some embodiments, the valve unit includes a first valve including the first valve member and a second valve including the second valve member separate from the first valve. Each of the first valve and the second valve includes a two-way valve. The first valve and the second valve may be individually controlled by the controller based on the cooling requirement of the core zone cooling arrangement, and the cooling requirement of the turbine case cooling arrangement and/or the oil cooling unit.

In some embodiments, the at least one controller includes a first controller and a second controller. The first controller is configured to control the first valve based on the cooling requirement of the core zone cooling arrangement. The second controller is configured to control the second valve based on the cooling requirement of at least one of the turbine case cooling arrangement and the oil cooling unit. The first controller and the second controller may control the first valve and the second valve, respectively, to meet the cooling requirement of the core zone cooling arrangement and the cooling requirement of the turbine case cooling arrangement and/or the oil cooling unit, which may increase the efficiency of the gas turbine engine.

In some embodiments, the at least one controller includes a single controller configured to control each of the first valve based on a cooling requirement of the core zone cooling arrangement and the second valve based on a cooling requirement of at least one of the turbine case cooling arrangement and the oil cooling unit. The single controller may modulate the airflow in each of the first duct and the second duct, thereby ensuring efficient cooling of the components within the engine core and the turbines and/or the oil cooling unit.

In some embodiments, the main duct is in fluid communication with at least one of a bypass duct of the gas turbine engine, a compressor of the gas turbine engine, and a cabin blower unit associated with the gas turbine engine to receive the airflow. The airflow received from the bypass duct, the compressor of the gas turbine engine, and/or the cabin blower unit may be directed towards the core zone cooling arrangement, and/or the turbine case cooling arrangement, and/or the oil cooling unit to cool various components of the gas turbine engine.

In some embodiments, the system further includes at least one first fixed flow duct separate from each of the first duct and the second duct and disposed in fluid communication with a first main duct and the core zone cooling arrangement. The at least one first fixed flow duct is configured to receive and direct a fixed amount of airflow from the first main duct towards the core zone cooling arrangement.

The first fixed flow duct may ensure that the components within the engine core always receive a minimum amount of airflow that may be required to cool such components. Further, the first fixed flow duct receives the fixed amount of airflow from the first main duct instead of the main duct. Hence, if the core zone cooling arrangement fails to receive the airflow from the main duct, the core zone cooling arrangement may still receive the fixed amount of airflow from the first fixed flow duct. Thus, the first fixed flow duct may provide a back-up system for directing cooling air towards the core zone cooling arrangement, thereby ensuring cooling of the components within the engine core during all operating conditions.

In some embodiments, the system further includes at least one second fixed flow duct separate from each of the first duct and the second duct and disposed in fluid communication with a second main duct and at least one of the turbine case cooling arrangement and the oil cooling unit. The at least one second fixed flow duct is configured to receive and direct a fixed amount of airflow from the second main duct towards at least one of the turbine case cooling arrangement and the oil cooling unit.

The second fixed flow duct may ensure that a minimum amount of airflow is being directed towards the turbine case cooling arrangement and/or the oil cooling unit, in order to cool the turbines and/or the oil cooling unit. Further, the second fixed flow duct receives the fixed amount of airflow from the second main duct instead of the main duct. Hence, if the turbine case cooling arrangement and/or the oil cooling unit fail to receive the airflow from the main duct, the turbine case cooling arrangement and/or the oil cooling unit may still receive the fixed amount of airflow from the second fixed flow duct. Thus, the second fixed flow duct may provide a back-up system for directing cooling air towards the turbine case cooling arrangement and/or the oil cooling unit, thereby ensuring cooling of the turbines and/or the oil cooling unit during all operating conditions.

In a second aspect, there is provided a gas turbine engine comprising: an engine core comprising a compressor, a combustor, a turbine and a core shaft connecting the turbine to the compressor; a fan located upstream of the engine core; and the system of the first aspect.

In some embodiments, the gas turbine engine may comprise a gearbox configured to receive an input from the core shaft output drive to the fan so as to drive the fan at a lower rotational speed than the core shaft.

In some embodiments, the compressor is a first compressor, the turbine is a first turbine, and the core shaft is a first core shaft, and the engine core further comprises a second compressor, a second turbine, and a second core shaft, the second compressor, second turbine and second core shaft are arranged to rotate at a higher rotational speed than the first core shaft.

In some embodiments, the gas turbine engine may further comprise a nacelle defining a bypass duct of the gas turbine engine.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

As used herein, the term "configured to" and like is at least as restrictive as the term "adapted to" and requires actual design intention to perform the specified function rather than mere physical capability of performing such a function.

As used herein, the terms "first", "second", and "third" are used as identifiers. Therefore, such terms should not be construed as limiting of this disclosure. The terms "first", "second" and "third", when used in conjunction with a feature or an element can be interchanged throughout the embodiments of this disclosure.

As used herein, "at least one of A and B" should be understood to mean "only A, only B, or both A and B".

As used herein, the term "partially" refers to any percentage greater than 1%. In other words, the term "partially" refers to any amount of a whole. For example, "partially" may refer to a small portion, half, or a selected portion of a whole. In some cases, "partially" may refer to a whole amount. The term "partially" refers to any percentage less than 100%.

Figure 1:
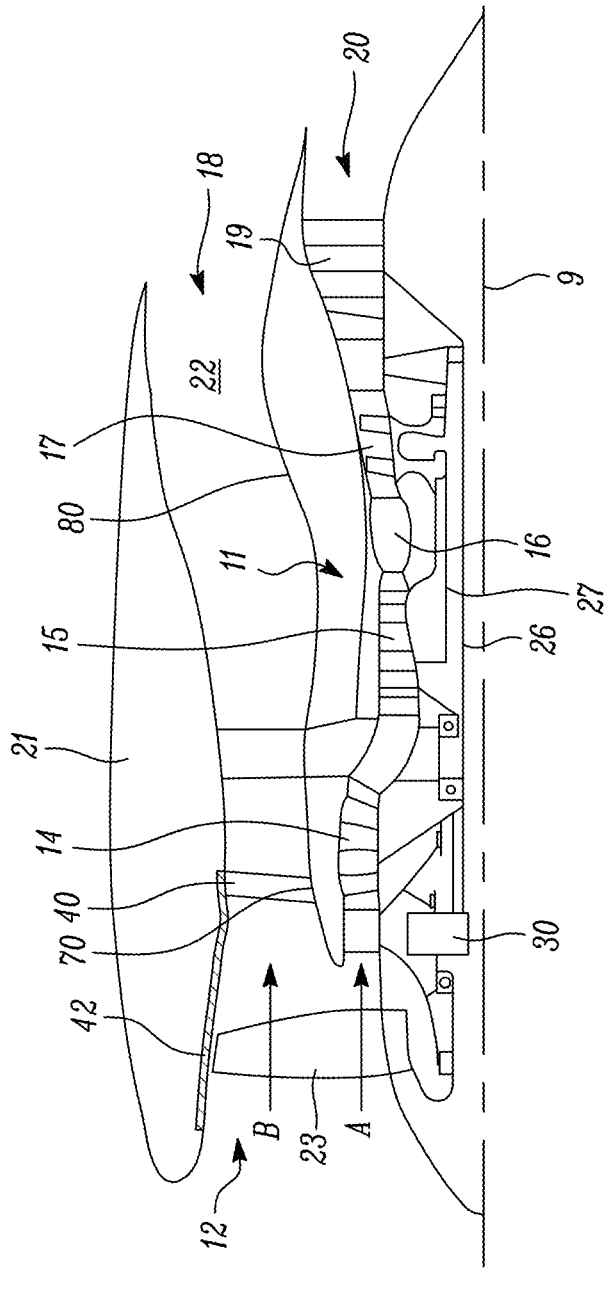
FIG. 1 is a schematic side view of a gas turbine engine, according to an embodiment of the present disclosure.

FIG. 1 illustrates a schematic side view of a gas turbine engine 10 having a principal rotational axis 9. The gas turbine engine 10 comprises an air intake 12 and a propulsive fan 23 that generates two airflows: a core airflow A and a bypass airflow B. The gas turbine engine 10 comprises an engine core 11 that receives the core airflow A. In other words, the core airflow A enters the engine core 11. The fan 23 is located upstream of the engine core 11. The engine core 11 comprises, in axial flow series, a compressor, a combustor, and a turbine. Specifically, the engine core 11 comprises, in axial flow series, a low pressure compressor 14, a high pressure compressor 15, a combustor 16, a high pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22 surrounding the engine core 11. The bypass airflow B flows through the bypass duct 22 to provide propulsive thrust, where it is straightened by a row of outer guide vanes 40 before exiting the bypass exhaust nozzle 18. The outer guide vanes 40 extend radially outwardly from an inner ring 70 which defines a radially inner surface of the bypass duct 22.

Rearward of the outer guide vanes 40, the engine core 11 is surrounded by an inner cowl 80 which provides an aerodynamic fairing defining an inner surface of the bypass duct 22. The inner cowl 80 is rearwards of and axially spaced from the inner ring 70. A fan case 42 defines an outer surface of the bypass duct 22. The inner ring 70 defines the inner surface of the bypass duct 22 towards the rear of the fan case 42. The fan 23 is attached to and driven by the low pressure turbine 19 via a first core shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustor 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. Respective core shafts connect the turbines 17, 19 to the compressors 14, 15. Specifically, the low pressure turbine 19 drives the low pressure compressor 14 by means of the first core shaft 26, and the high pressure turbine 17 drives the high pressure compressor 15 by means of a second core shaft 27 or an interconnecting shaft. The fan 23 generally provides the majority of the propulsive thrust. The epicyclic gearbox 30 is a reduction gearbox.

Figure 2:
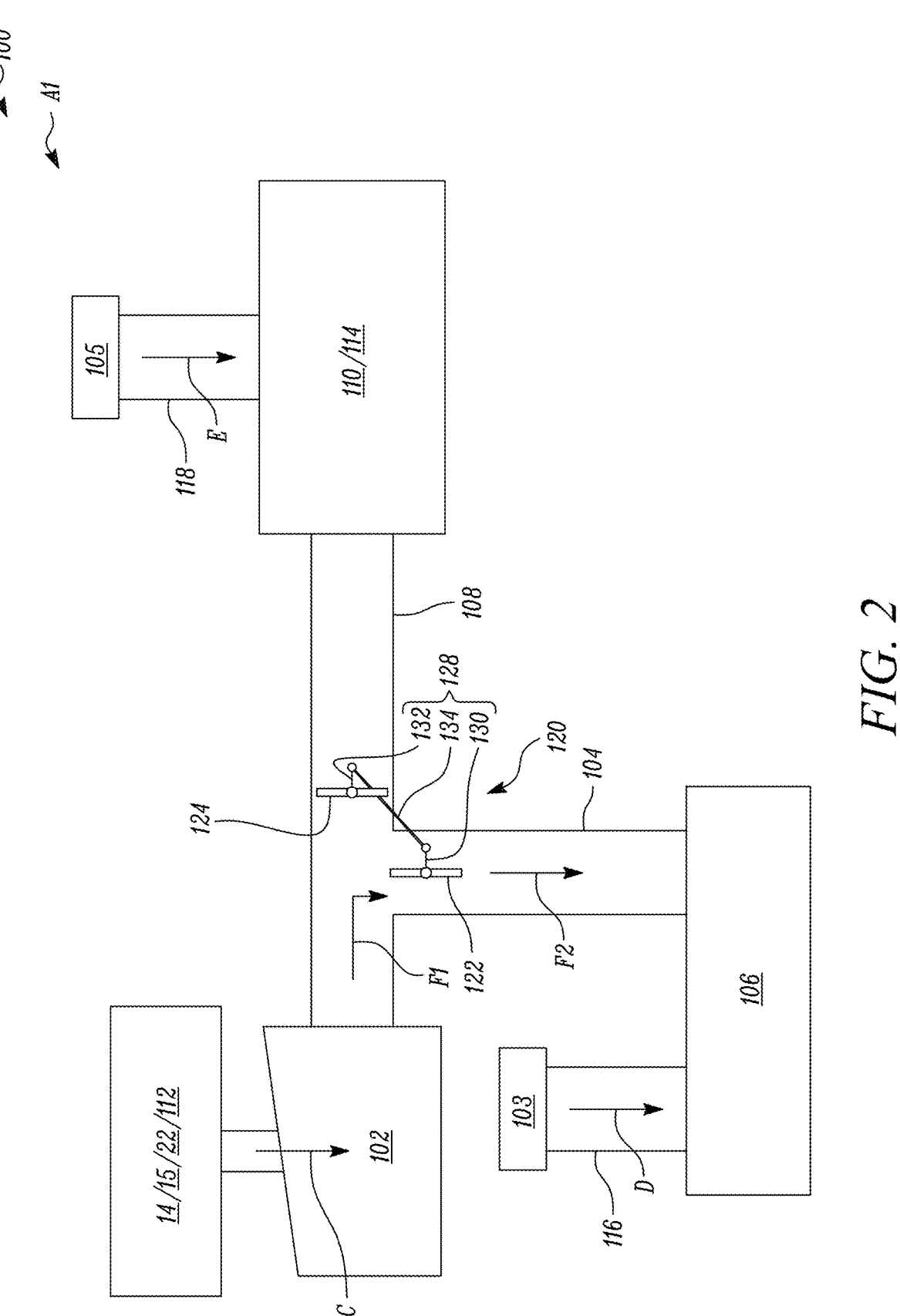
FIG. 2 is a schematic view of a system for cooling one or more components associated with the gas turbine engine of FIG. 1, according to an embodiment of the present disclosure.

FIG. 2 shows a schematic view of a system 100 for cooling one or more components associated with the gas turbine engine 10 of FIG. 1. Particularly, the gas turbine engine 10 includes the system 100. In some cases, the one or more components may include at least one of the low pressure compressor 14 (see FIG. 1), the high pressure compressor 15 (see FIG. 1), the combustor 16 (see FIG. 1), the high pressure turbine 17 (see FIG. 1), the low pressure turbine 19 (see FIG. 1), a turbine case (not shown) within which the turbines 17, 19 are mounted, and the like, without limiting the scope of the present disclosure.

The system 100 includes a main duct 102. The main duct 102 receives an airflow F1 for cooling the one or more components associated with the gas turbine engine 10. The main duct 102 is in fluid communication with at least one of the bypass duct 22 (see FIG. 1) of the gas turbine engine 10, the compressors 14, 15 of the gas turbine engine 10, and/or a cabin blower unit 112 associated with the gas turbine engine 10 to receive the airflow F1. In some examples, the airflow F1 may include a portion of the bypass airflow B (see FIG. 1) flowing through the bypass duct 22 that typically has a temperature below 100° Celsius. In other examples, the airflow F1 may include a portion of air (for example, compressed air) bled from the compressors 14, 15. Further, the airflow F1 if received from the cabin blower unit 112 may include, for example, recirculated airflow from an air conditioning system used for cooling a cabin.

The system 100 further includes a first duct 104 disposed in fluid communication with the main duct 102. The first duct 104 is configured to receive and direct a portion of the airflow F1 from the main duct 102 towards a core zone cooling arrangement 106 of the gas turbine engine 10. The core zone cooling arrangement 106 may also be referred to as core zone ventilation arrangement 106. It should be noted that the core zone cooling arrangement 106 may facilitate cooling of the components disposed within the engine core 11 (see FIG. 1) and may also facilitate condensate/vapor ejection. Specifically, the core zone cooling arrangement 106 may receive an airflow F2 from the main duct 102 and direct the airflow F2 towards the engine core 11 to cool the components, for example, the compressors 14, 15, the combustor 16, and the like. The first duct 104 receives the airflow F2 from the main duct 102 and directs the airflow F2 towards the core zone cooling arrangement 106 in order to prevent overheating of the engine core 11 and the components within the engine core 11.

The system 100 further includes a second duct 108 separate from the first duct 104 and disposed in fluid communication with the main duct 102. Specifically, the first duct 104 is inclined to the second duct 108 by an inclination angle. In some embodiments, the inclination angle may be 90 degrees. In other embodiments, the inclination angle defined between the first duct 104 and the second duct 108 may be more than or less than 90 degrees based on application attributes. The second duct 108 is configured to receive and direct a portion of the airflow F1 from the main duct 102 towards at least one of a turbine case cooling arrangement 110 of the gas turbine engine 10 and an oil cooling unit 114 of the gas turbine engine 10.

It should be noted that the turbine case cooling arrangement 110 may direct an airflow F3 (shown in FIGS. 4 and 5) towards the turbine case of the gas turbine engine 10 to cool the high pressure and/or the low pressure turbines 17, 19 disposed in the turbine case. Thus, the second duct 108 receives the airflow F3 from the main duct 102 and directs the desired amount of airflow towards the turbine case cooling arrangement 110 in order to prevent overheating of the turbines 17, 19 of the gas turbine engine 10 and/or maintain desired tip clearance between the turbine(s) and the turbine case.

Further, the oil cooling unit 114 may be used to maintain a temperature of oil, such as lubricant oil, that may be directed towards various components of the gas turbine engine 10. Specifically, the oil cooling unit 114 may include one or more oil heat exchangers, such as, a matrix air-cooled oil cooler (MACOC). The airflow F3 may remove surplus heat from oil flowing through the oil cooling unit 114 which may be eventually circulated through the gas turbine engine 10.

In some embodiments, the system 100 further includes at least one first fixed flow duct 116 separate from each of the first duct 104 and the second duct 108 and disposed in fluid communication with a first main duct 103 and the core zone cooling arrangement 106. The at least one first fixed flow duct 116 is configured to receive and direct a fixed amount of airflow D from the first main duct 103 towards the core zone cooling arrangement 106. In the illustrated embodiment of FIG. 2, a single first fixed flow duct 116 is illustrated. However, in other cases, the system 100 may include any number of first fixed flow ducts 116 in order to direct the fixed amount of airflow D to the core zone cooling arrangement 106 to prevent the components of the engine core 11 from overheating. In some cases, the first fixed flow duct 116 may receive the airflow D from at least one of the compressors 14, 15, the bypass duct 22, and the cabin blower unit 112. Further, the source from which the main duct 102 receives the airflow F1 may be different from the source from which the first main duct 103 receives the airflow D. For example, if the main duct 102 receives the airflow F1 from the compressors 14, 15, then the first fixed flow duct 116 may receive the airflow D either from bypass duct 22 or the cabin blower unit 112.

The first fixed flow duct 116 may ensure that the core zone cooling arrangement 106 always receives a minimum amount of airflow that may be required to cool the components within the engine core 11. Further, the first fixed flow duct 116 receives the fixed amount of airflow D from the first main duct 103 instead of the main duct 102. Hence, if the core zone cooling arrangement 106 fails to receive the airflow F2 from the main duct 102, the core zone cooling arrangement 106 may still receive the fixed amount of airflow D from the first fixed flow duct 116. Thus, the first fixed flow duct 116 may provide an integrity flow, directed towards the core zone cooling arrangement 106, thereby ensuring cooling of the components within the engine core 11 during all operating conditions. It should be noted that the first fixed flow duct 116 is optional and may be omitted in other embodiments.

The system 100 further includes at least one second fixed flow duct 118 separate from each of the first duct 104 and the second duct 108 and disposed in fluid communication with a second main duct 105 and at least one of the turbine case cooling arrangement 110 and the oil cooling unit 114. The at least one second fixed flow duct 118 is configured to receive and direct a fixed amount of airflow E from the second main duct 105 towards at least one of the turbine case cooling arrangement 110 and the oil cooling unit 114. In the illustrated embodiment of FIG. 2, a single second fixed flow duct 118 is illustrated. However, in other cases, the system 100 may include any number of second fixed flow ducts 118 to direct the fixed amount of airflow E to the turbine case cooling arrangement 110 and/or the oil cooling unit 114. Further, the source from which the main duct 102 receives the airflow F1 may be different from the source from which the second main duct 105 receives the airflow E. For example, if the main duct 102 receives the airflow F1 from the compressors 14, 15, then the second main duct 105 may receive the airflow E either from the bypass duct 22 or the cabin blower unit 112. Furthermore, the source from which the first main duct 103 receives the airflow D may be different or same as the source from which the second main duct 105 receives the airflow E.

The second fixed flow duct 118 may ensure that a minimum amount of airflow is being directed towards the turbine case cooling arrangement 110 and/or the oil cooling unit 114, in order to cool the turbines 17, 19 and/or the oil cooling unit 114. Further, the second fixed flow duct 118 receives the fixed amount of airflow E from the second main duct 105 instead of the main duct 102. Hence, if the turbine case cooling arrangement 110 and/or the oil cooling unit 114 fail to receive the airflow F3 from the main duct 102, the turbine case cooling arrangement 110 and/or the oil cooling unit 114 may still receive the fixed amount of airflow E from the second fixed flow duct 118. Thus, the second fixed flow duct 118 may provide an integrity flow, directed towards the turbine case cooling arrangement 110 and/or the oil cooling unit 114, thereby ensuring turbine tip clearance control, cooling of the turbines 17, 19 and/or the oil cooling unit 114 during all operating conditions. It should be noted that the second fixed flow duct 118 is optional and may be omitted in other embodiments.

The system 100 further includes a valve unit 120. The valve unit 120 includes a first valve member 122 disposed in the first duct 104 and a second valve member 124 disposed in the second duct 108. The first valve member 122 is configured to control a fluid flow through the first duct 104. The second valve member 124 is configured to control a fluid flow through the second duct 108. In other words, the first valve member 122 controls an amount of the airflow F2 being directed from the main duct 102 towards the core zone cooling arrangement 106 of the gas turbine engine 10. Further, the second valve member 124 controls an amount of the airflow F3 being directed from the main duct 102 towards the turbine case cooling arrangement 110 and/or the oil cooling unit 114.

In some embodiments, the valve unit 120 includes a three-way valve configured to modulate the portion of the airflow F1 through each of the first duct 104 and the second duct 108. The three-way valve may modulate the portion of the airflow F1 to the core zone cooling arrangement 106 and/or at least one of the turbine case cooling arrangement 110 and the oil cooling unit 114 of the gas turbine engine 10. Therefore, the single three-way valve may allow some portion of the airflow F1 to be directed towards the core zone cooling arrangement 106 and/or at least one of the turbine case cooling arrangement 110 and the oil cooling unit 114.

The valve unit 120 includes the first valve member 122, the second valve member 124, and a connecting rod assembly 128 that connects the first valve member 122 with the second valve member 124. The connecting rod assembly 128 includes a first rod 130 pivotally connected to the first valve member 122. The connecting rod assembly 128 further includes a second rod 132 pivotally connected to the second valve member 124. The connecting rod assembly 128 further includes a main rod 134 pivotally connected to each of the first rod 130 and the second rod 132. The first rod 130, the second rod 132, and the main rod 134 of the connecting rod assembly 128 may form a 3-bar linkage that may allow simultaneous actuation of both the first and second valve members 122, 124, even when only one of the first and second valve members 122, 124 is being directly controlled by a controller 136 (shown in FIG. 3).

Figure 3:
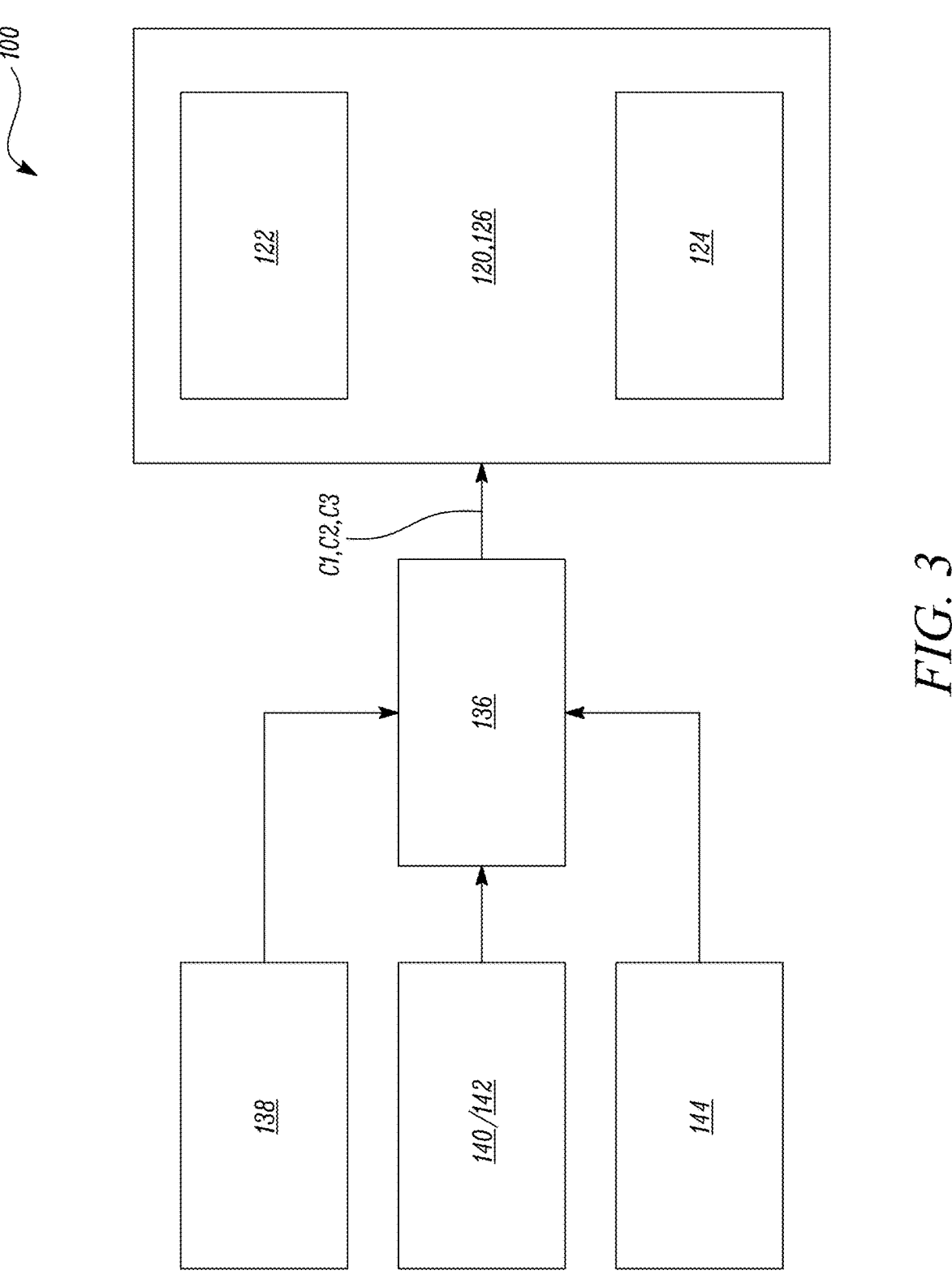
FIG. 3 is a block diagram of the system of FIG. 2 including a single controller communicably coupled with a valve unit.

FIG. 3 shows a block diagram of the system 100. The system 100 includes at least one controller 136 communicably coupled with the valve unit 120. The at least one controller 136 is configured to control the valve unit 120 to modulate the portion of the airflow F1 through each of the first duct 104 and the second duct 108.

The controller 136 may include one or more processors and one or more controllers. In some examples, the memories may include a random access memory (RAM), such as synchronous dynamic random access memory (SDRAM), a read-only memory (ROM), a non-volatile random access memory (NVRAM), an electrically erasable programmable read-only memory (EEPROM), a FLASH memory, a magnetic or optical data storage media, and the like, that can be used to store various information or desired program codes in the form of instructions or data structures and that can be accessed by processors.

Further, the processors may execute various types of digitally stored instructions, such as software applications or algorithms, retrieved from the memories, or a firmware program which may enable the processors to perform a wide variety of operations. It should be noted that the processors may embody a single microprocessor or multiple microprocessors for receiving various input signals and generating output signals. Numerous commercially available microprocessors may perform the functions of the processors. Each processor may further include a general processor, a central processing unit, an application specific integrated circuit (ASIC), a digital signal processor, a field programmable gate array (FPGA), a digital circuit, an analog circuit, a microcontroller, any other type of processor, or any combination thereof. Each processor may include one or more components that may be operable to execute computer executable instructions or computer code that may be stored and retrieved from the memories.

In some cases, the system 100 may include one or more sensors 138 communicably coupled to the at least one controller 136 and associated with the core zone cooling arrangement 106 (see FIG. 2) of the gas turbine engine 10 (see FIG. 1). Further, the system 100 may include one or more sensors 140 communicatively coupled to the at least one controller 136 and associated with the turbine case cooling arrangement 110 (see FIG. 2). Furthermore, the system 100 may include one or more sensors 142 communicably coupled to the at least one controller 136 and associated with the oil cooling unit 114 (see FIG. 2). In some examples, each of the sensors 138, 140, 142 may include temperature sensors. In an example, the sensor 138 associated with the core zone cooling arrangement 106 may determine a temperature of the components within the engine core 11 (see FIG. 1). The sensor 140 associated with the turbine case cooling arrangement 110 may determine a temperature of the components within the turbine case. The sensor 142 associated with the oil cooling unit 114 may determine a temperature of the oil cooling unit 114.

In the illustrated embodiment of FIG. 3, the at least one controller 136 includes a single controller 136 configured to control the valve unit 120 based on a cooling requirement of the core zone cooling arrangement 106 and a cooling requirement of at least one of the turbine case cooling arrangement 110 and the oil cooling unit 114. In some examples, the sensors 138, 140, 142 are communicably coupled to the controller 136. The controller 136 may control the valve unit 120 so that the valve unit 120 may be operable in a first configuration A1 (shown in FIG. 2), a second configuration A2 (shown in FIG. 4), or a third configuration A3 (shown in FIG. 5). In an example, the controller 136 may control the valve unit 120 to direct an increased amount of airflow F2 towards the core zone cooling arrangement 106 if the temperature determined by the sensor 138 is above a predetermined temperature threshold value or if a current operating condition of the gas turbine engine 10 warrants cooling of the components of the engine core 11. For example, the controller 136 may control the valve unit 120 to reduce the amount of airflow F2 towards the core zone cooling arrangement 106 during stabilized conditions, such as cruise, to reduce air consumption, and thereby improving engine efficiency.

In other examples, the controller 136 may control the valve unit 120 if the temperature determined by the sensor 140, 142 is above a predetermined temperature threshold value or if the current operating condition of the gas turbine engine 10 warrants cooling of the turbines 17, 19 (see FIG. 1) or the oil cooling unit 114. For example, the controller 136 may control the valve unit 120 to direct the increased amount of airflow F3 towards the turbine case cooling arrangement 110 during cruise conditions and during stabilized conditions. Further, the controller 136 may control the valve unit 120 to direct minimum or no airflow F3 towards the turbine case cooling arrangement 110 during transient conditions, instead, excess air that is not being used by the turbine case cooling arrangement 110 may be directed towards the core zone ventilation arrangement 106. It should be noted that the operating conditions based on which the controller 136 controls the valve unit 120 as mentioned herein are exemplary in nature, and the controller 136 may be programmed to control the valve unit 120 as per multiple operating conditions and/or cooling requirements of the core zone cooling arrangement 106, the turbine case cooling arrangement 110, and/or the oil cooling unit 114.

Further, the controller 136 controls one of the first valve member 122 and the second valve member 124. Specifically, any one of the first valve member 122 and the second valve member 124 may include a solenoid or a motorized actuator that may be actuated by the controller 136. Moreover, the other of the first valve member 122 and the second valve member 124 is actuated by the connecting rod assembly 128 based on an actuation of the one of the first valve member 122 and the second valve member 124 by the at least one controller 136.

Further, in the first configuration A1 of the valve unit 120, the first valve member 122 is fully open to allow the fluid flow through the first duct 104 and the second valve member 124 is fully closed to block the fluid flow through the second duct 108. In other words, in the first configuration A1 of the valve unit 120, the controller 136 may control the valve unit 120 such that the first valve member 122 is fully open and allows the airflow F2 to flow through the first duct 104 towards the core zone cooling arrangement 106. In an example wherein the components of the engine core 11 require higher amounts of the airflow F2, the controller 136 may transmit a control signal C1 to the valve unit 120 to operate the valve unit 120 in the first configuration A1. In some examples, the control signal C1 may be transmitted to the first valve member 122, such that the first valve member 122 moves to a fully open position which in turn causes the second valve member 124 to move towards a fully closed position. In another example, the control signal C1 may be transmitted to the second valve member 124, such that the second valve member 124 moves to the fully closed position which in turn causes the first valve member 122 to move towards the fully open position.

Figure 4:
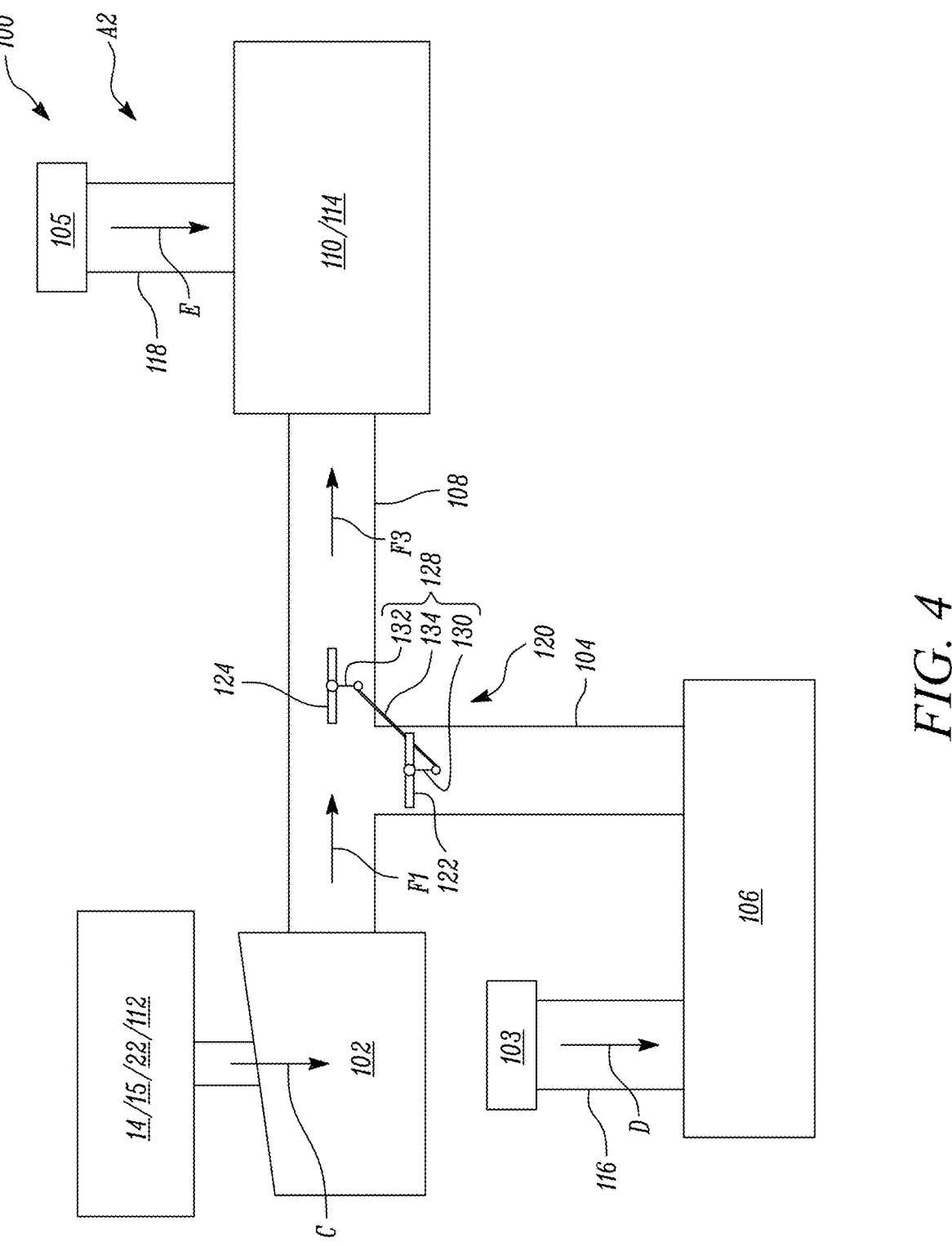
FIG. 4 is a schematic view of the valve unit of the system of FIG. 2 in a second configuration.

FIG. 4 is a schematic view illustrating the valve unit 120 of the system 100 of FIG. 2 in the second configuration A2. Specifically, in the second configuration A2 of the valve unit 120, the first valve member 122 is fully closed to block the fluid flow through the first duct 104 and the second valve member 124 is fully open to allow the fluid flow through the second duct 108. In other words, in the second configuration A2 of the valve unit 120, the controller 136 controls the valve unit 120 such that the second valve member 124 is fully open and allows the airflow F3 to flow through the second duct 108 towards at least one of the turbine case cooling arrangement 110 and the oil cooling unit 114. In an example wherein higher amounts of the airflow F3 needs to be directed towards at least one of the turbine case cooling arrangement 110 and the oil cooling unit 114, the controller 136 may transmit a control signal C2 to the valve unit 120 to operate the valve unit 120 in the second configuration A2. In some examples, the control signal C2 may be transmitted to the first valve member 122, such that the first valve member 122 moves to a fully closed position which in turn causes the second valve member 124 to move towards an open position. In another example, the control signal C2 may be transmitted to the second valve member 124, such that the second valve member 124 moves to the fully open position which in turn causes the first valve member 122 to move towards the fully closed position.

Figure 5:
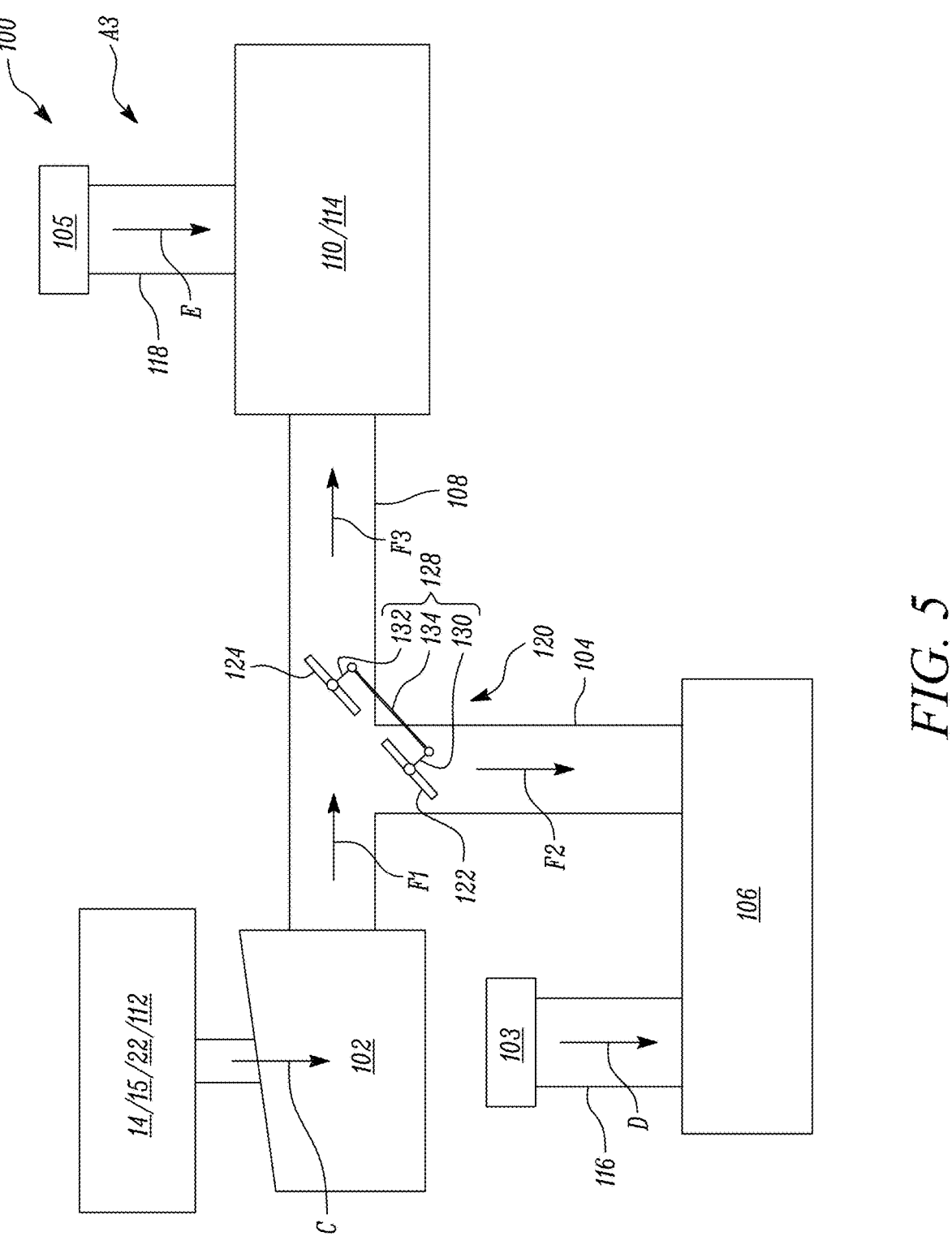
FIG. 5 is a schematic view of the valve unit of the system of FIG. 2 in a third configuration.

FIG. 5 is a schematic view illustrating the valve unit 120 of the system 100 of FIG. 2 in the third configuration A3. Specifically, in the third configuration A3 of the valve unit 120, each of the first valve member 122 and the second valve member 124 is partially open. It should be noted that the controller 136 controls the valve unit 120 such that each of the first valve member 122 and the second valve member 124 is partially open to allow the airflow F2, F3 to flow towards each of the core zone cooling arrangement 106 and at least one of the turbine case cooling arrangement 110 and the oil cooling unit 114, respectively. In an example wherein some amount of the airflow F2, F3 needs to be directed towards each of the core zone cooling arrangement 106 and at least one of the turbine case cooling arrangement 110 and the oil cooling unit 114, the controller 136 may transmit a control signal C3 to the valve unit 120 to operate the valve unit 120 in the third configuration A3. In some examples, the control signal C3 may be transmitted to the first valve member 122, such that the first valve member 122 moves to a partially open position which in turn causes the second valve member 124 to move towards a partially open position. In another example, the control signal C3 may be transmitted to the second valve member 124, such that the second valve member 124 moves to the partially open position which in turn causes the first valve member 122 to move towards the partially open position.

In some embodiments, the system 100 further includes a user interface 144 communicably coupled to the at least one controller 136. The user interface 144 may include a display unit having a display configured to display an information associated with the cooling requirements of each of the core zone cooling arrangement 106, the turbine case cooling arrangement 110, and the oil cooling unit 114. The user interface 144 may include one or more input means that may allow an operator to input commands to the controller 136. In some cases, the user interface 144 may allow the operator to manually change the configuration (i.e., between the first, second, and third configurations A1, A2, A3) of the valve unit 120 to modulate the portion of the airflow F1 through each of the first duct 104 and the second duct 108. Further, the user interface 144 may also provide a manual override feature wherein the operator may override the control signals C1, C2, C3 being transmitted by the controller 136.

The airflow F2, F3 being directed towards the core zone cooling arrangement 106 and at least one of the turbine case cooling arrangement 110 and the oil cooling unit 114 may help to maintain a temperature of the components of the gas turbine engine 10 (see FIG. 1) within desired/acceptable limits and may also control a thermal expansion of the components. The controller 136 may control the valve unit 120 to direct a desired amount of the airflow F2, F3 to the core zone cooling arrangement 106 and at least one of the turbine case cooling arrangement 110 and the oil cooling unit 114, respectively, based on current operating condition of the gas turbine engine 10. Thus, the system 100 may ensure that sufficient amount of airflow F2, F3 is directed towards the components of the gas turbine engine 10, thereby providing sufficient cooling and reduce noise generation. Further, the system 100 ensures that, during engine low power conditions, the core zone cooling arrangement 106 may be provided with increased amounts of the cooling air flow that is not being used by the turbine case cooling arrangement 110, due to which the first fixed flow duct 116 associated with the core zone cooling arrangement 106 can be reduced in size. Furthermore, the system 100 may improve an efficiency of the gas turbine engine 10. Specifically, during engine high power conditions, the system 100 may reduce an amount of air flow F1 being drawn through the compressors 14, 15, the bypass duct 22, and/or the cabin blower unit 112 for providing cooling of the core zone cooling arrangement 106. The system 100 described herein may be simple and cost-effective to incorporate in gas turbine engines.

Figure 6:
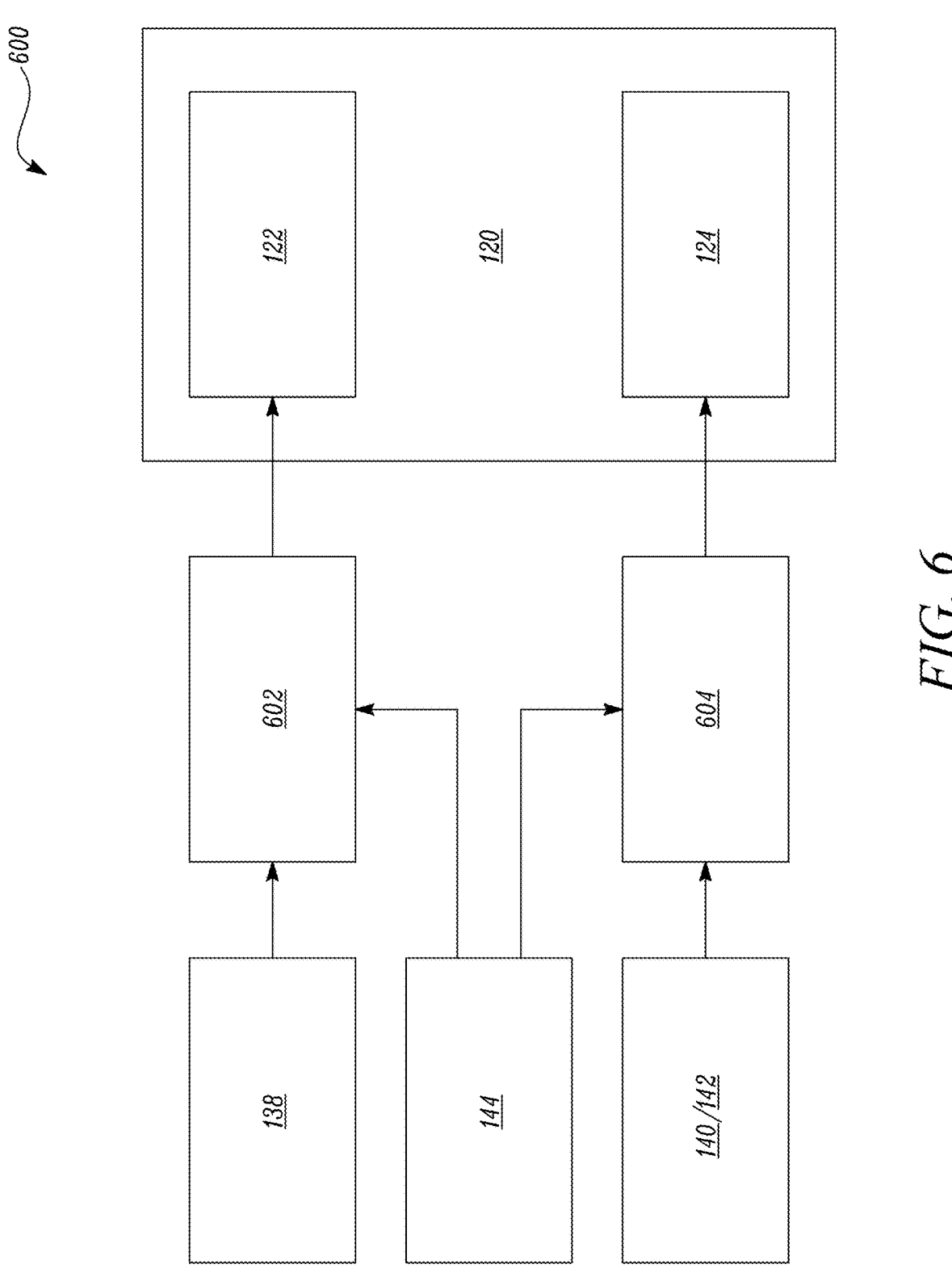
FIG. 6 is a block diagram of a system for cooling one or more components associated with the gas turbine engine of FIG. 1 having two controllers, according to another embodiment of the present disclosure.

FIG. 6 shows a block diagram of a system 600, according to another embodiment of the present disclosure. The system 600 is functionally similar to the system 100 of FIGS. 2 to 5 with common components being referred to by the same numerals. However, the system 600 includes at least one controller 602, 604. Specifically, the at least one controller 602, 604 includes a first controller 602 and a second controller 604 (instead of the single controller 136 shown in FIG. 3).

The first controller 602 is configured to control the valve unit 120 based on the cooling requirement of the core zone cooling arrangement 106. The first controller 602 may control the valve unit 120 based on the input from the sensor 138 or based on the current operating condition of the gas turbine engine 10 (see FIG. 1). If the first controller 602 determines that an increased amount of the airflow F2 needs to be directed towards the core zone cooling arrangement 106 (see FIG. 2) and a lesser amount of the airflow F3 needs to be directed towards at least one of the turbine case cooling arrangement 110 (see FIG. 2) and the oil cooling unit 114 (see FIG. 2), the first controller 602 may control the valve unit 120 to operate the valve unit 120 in the first configuration A1 (as shown in FIG. 2).

The second controller 604 is configured to control the valve unit 120 based on the cooling requirement of at least one of the turbine case cooling arrangement 110 and the oil cooling unit 114. The second controller 604 may control the valve unit 120 based on the input from the sensor 140, 142 or based on the current operating condition of the gas turbine engine 10. If the second controller 604 determines that an increased amount of the airflow F3 needs to be directed towards at least one of the turbine case cooling arrangement 110 and the oil cooling unit 114 and a lesser amount of the airflow F2 needs to be directed towards the core zone cooling arrangement 106, the second controller 604 may control the valve unit 120 to operate the valve unit 120 in the second configuration A2 (as shown in FIG. 4).

Further, any one of the first controller 602 and the second controller 604 may also be programmed to determine if each of the core zone cooling arrangement 106 and at least one of the turbine case cooling arrangement 110 and the oil cooling unit 114 require some amount of the airflow F2, F3. In such examples, any one of the first controller 602 and the second controller 604 may be designed to control any one of the first valve member 122 and the second valve member 124 to operate the valve unit 120 in the third configuration A3 (as shown in FIG. 5).

Figure 7:
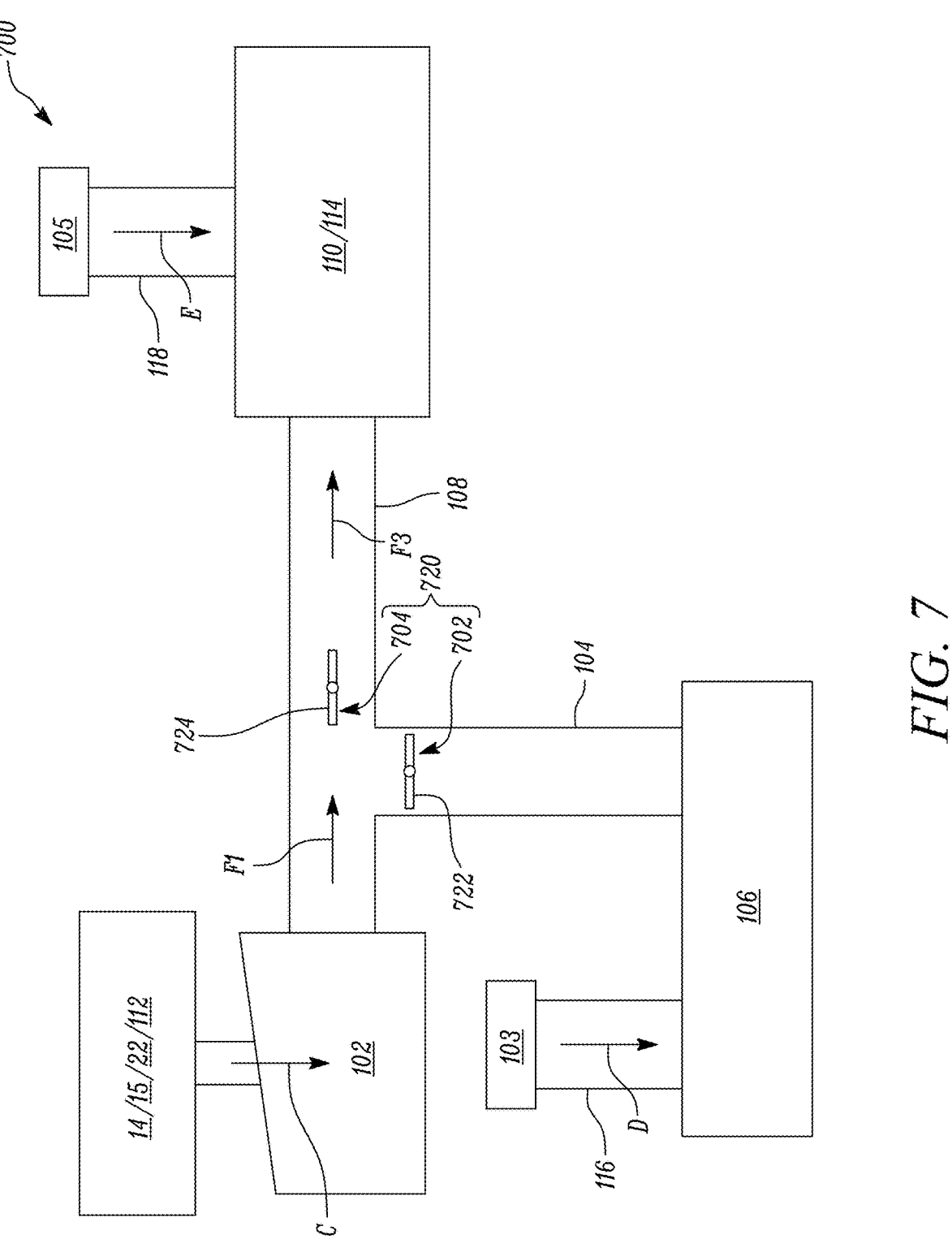
FIG. 7 is a schematic view of a system for cooling one or more components associated with the gas turbine engine of FIG. 1 having two separate valves, according to yet another embodiment of the present disclosure.

FIG. 7 shows a schematic view of a system 700 for cooling one or more components associated with the gas turbine engine 10 of FIG. 1, according to yet another embodiment of the present disclosure. The system 700 is functionally similar to the system 100 of FIGS. 2 to 5 with common components being referred to by the same numerals. However, the system 700 includes a valve unit 720. The valve unit 720 includes a first valve 702 including a first valve member 722 and a second valve 704 including a second valve member 724 separate from the first valve 702. Further, each of the first valve 702 and the second valve 704 includes a two-way valve herein.

Figure 8:
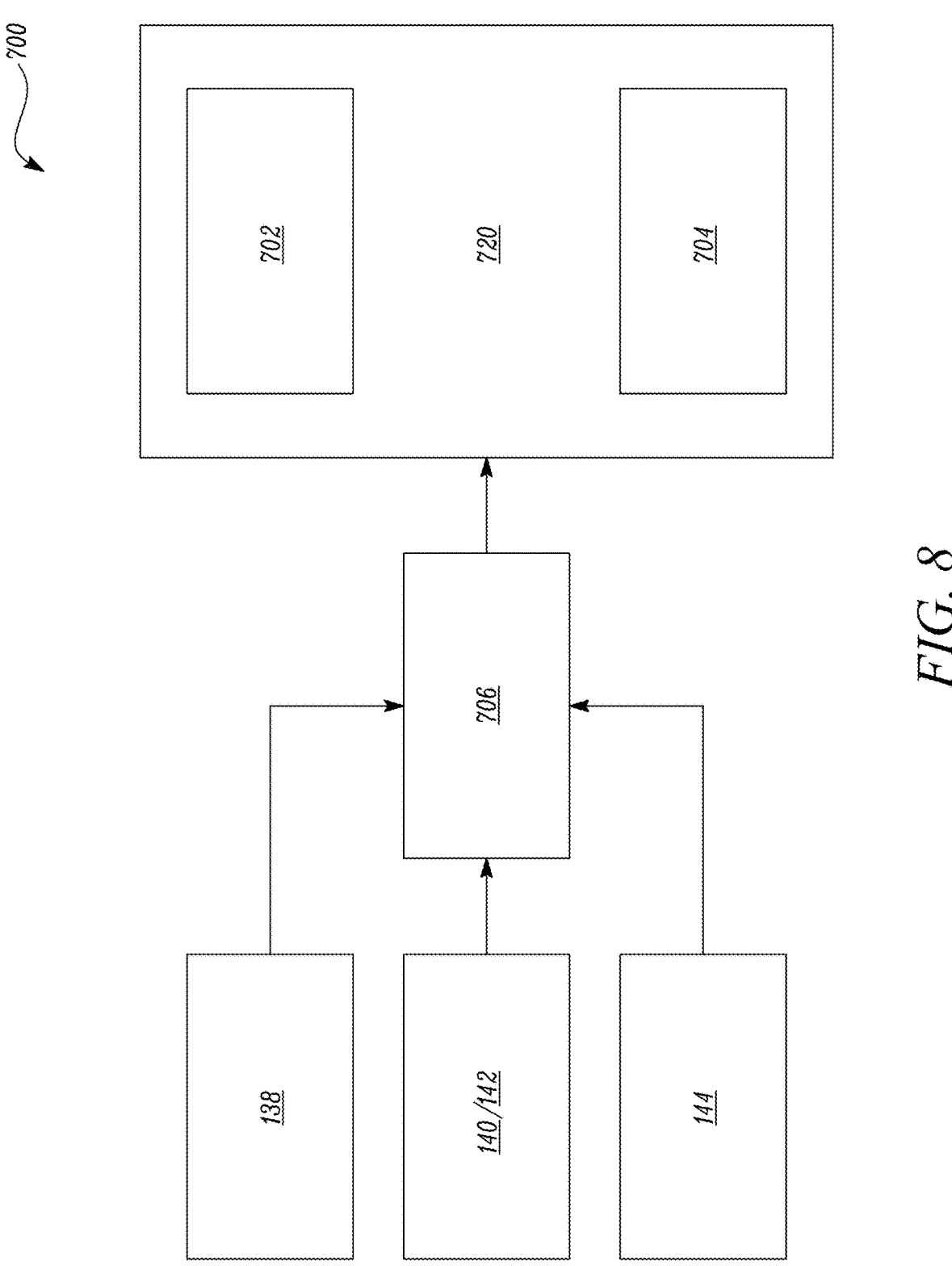
FIG. 8 is a block diagram of the system of FIG. 7 having a single controller.

FIG. 8 is a block diagram of the system 700 of FIG. 7. In the illustrated embodiment of FIG. 8, the system 700 includes at least one controller 706. The at least one controller 706 includes a single controller 706 configured to control each of the first valve 702 based on the cooling requirement of the core zone cooling arrangement 106 (see FIG. 2) and the second valve 704 based on the cooling requirement of at least one of the turbine case cooling arrangement 110 (see FIG. 2) and the oil cooling unit 114 (see FIG. 2).

The controller 706 may control the first valve 702 based on the input from the sensor 138 or based on the current operating condition of the gas turbine engine 10 (see FIG. 1). If the controller 706 determines that increased amount of the airflow F2 needs to be directed towards the core zone cooling arrangement 106 and lesser amount of the airflow F3 needs to be directed towards at least one of the turbine case cooling arrangement 110 and the oil cooling unit 114, the controller 706 may control the first valve 702 to operate the first valve 702 in an open position to allow the fluid flow towards the core zone cooling arrangement 106. Further, the controller 706 may operate the second valve 704 in a closed position to block the fluid flow towards at least one of the turbine case cooling arrangement 110 and the oil cooling unit 114.

The controller 706 may control the second valve 704 based on the input from the sensor 140, 142 or based on the current operating condition of the gas turbine engine 10. If the controller 706 determines that increased amount of the airflow F3 needs to be directed towards at least one of the turbine case cooling arrangement 110 and the oil cooling unit 114 and lesser amount of the airflow F2 needs to be directed towards the core zone cooling arrangement 106, the controller 706 may control the second valve 704 to operate the second valve 704 in an open position to allow the fluid flow towards at least one of the turbine case cooling arrangement 110 and the oil cooling unit 114. Further, the controller 706 may control the first valve 702 to operate the first valve 702 in a closed position to block the fluid flow towards the core zone cooling arrangement 106.

Further, the controller 706 may also determine if each of the core zone cooling arrangement 106 and at least one of the turbine case cooling arrangement 110 and the oil cooling unit 114 require some amount of the airflow F2, F3. In such examples, the controller 706 may generate control signals to operate each of the first valve 702 and the second valve 704 in a partially open position. Therefore, the single controller 706 may modulate some portion of the airflow F1 in each of the first duct 104 (see FIG. 7) and the second duct 108 (see FIG. 7), thereby ensuring efficient cooling of the components within the engine core 11 (see FIG. 1), and the turbines 17, 19 (see FIG. 1) and/or the oil cooling unit 114.

Figure 9:
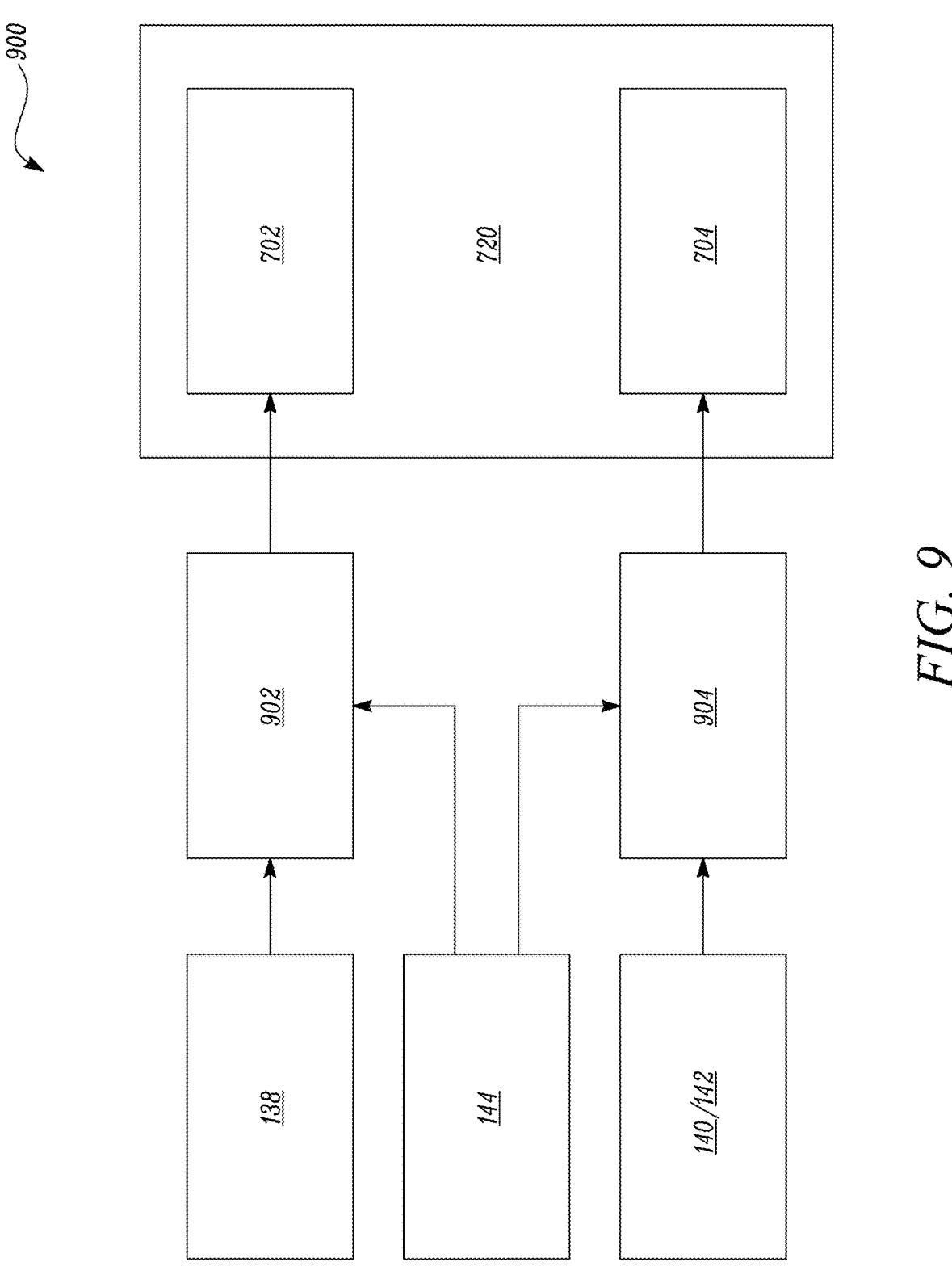
FIG. 9 is a block diagram of a system for cooling one or more components associated with the gas turbine engine of FIG. 1 having two controllers, according to an embodiment of the present disclosure.

FIG. 9 is a block diagram of a system 900 according to yet another embodiment of the present disclosure. The system 900 is substantially and functionally similar to the system 700 of FIGS. 7 and 8 with common components being referred to by the same numerals. However, the system 900 includes at least one controller 902, 904. Specifically, the at least one controller 902, 904 includes a first controller 902 and a second controller 904 (instead of the single controller 706 shown in FIG. 8).

The first controller 902 is configured to control the first valve 702 based on the cooling requirement of the core zone cooling arrangement 106. The first controller 902 may control the first valve 702 based on the input from the sensor 138 or the current operating condition of the gas turbine engine 10 (see FIG. 1). If the first controller 902 determines that an increased amount of the airflow F2 needs to be directed towards the core zone cooling arrangement 106 (see FIG. 7) and a lesser amount of the airflow F3 needs to be directed towards at least one of the turbine case cooling arrangement 110 (see FIG. 7) and the oil cooling unit 114 (see FIG. 7), the first controller 902 may control the first valve 702 to operate the first valve 702 in the open position to allow the fluid flow towards the core zone cooling arrangement 106

The second controller 904 is configured to control the second valve 704 based on the cooling requirement of at least one of the turbine case cooling arrangement 110 and the oil cooling unit 114. The second controller 904 may control the second valve 704 based on the input from the sensors 140, 142 or the current operating condition of the gas turbine engine 10. If the second controller 904 determines that an increased amount of the airflow F3 needs to be directed towards at least one of the turbine case cooling arrangement 110 and the oil cooling unit 114 and a lesser amount of the airflow F2 needs to be directed towards the core zone cooling arrangement 106, the second controller 904 may control the second valve 704 to operate the second valve 704 in the open position to allow the fluid flow towards at least one of the turbine case cooling arrangement 110 and the oil cooling unit 114.

Further, any one of the first controller 902 and the second controller 904 may also be programmed to determine if each of the core zone cooling arrangement 106 and at least one of the turbine case cooling arrangement 110 and the oil cooling unit 114 require some amount of the airflow F2, F3. In such examples, one of the first controller 902 and the second controller 904 may generate control signals to operate each of the first valve 702 and the second valve 704 in a partially open position.

Figure 10:
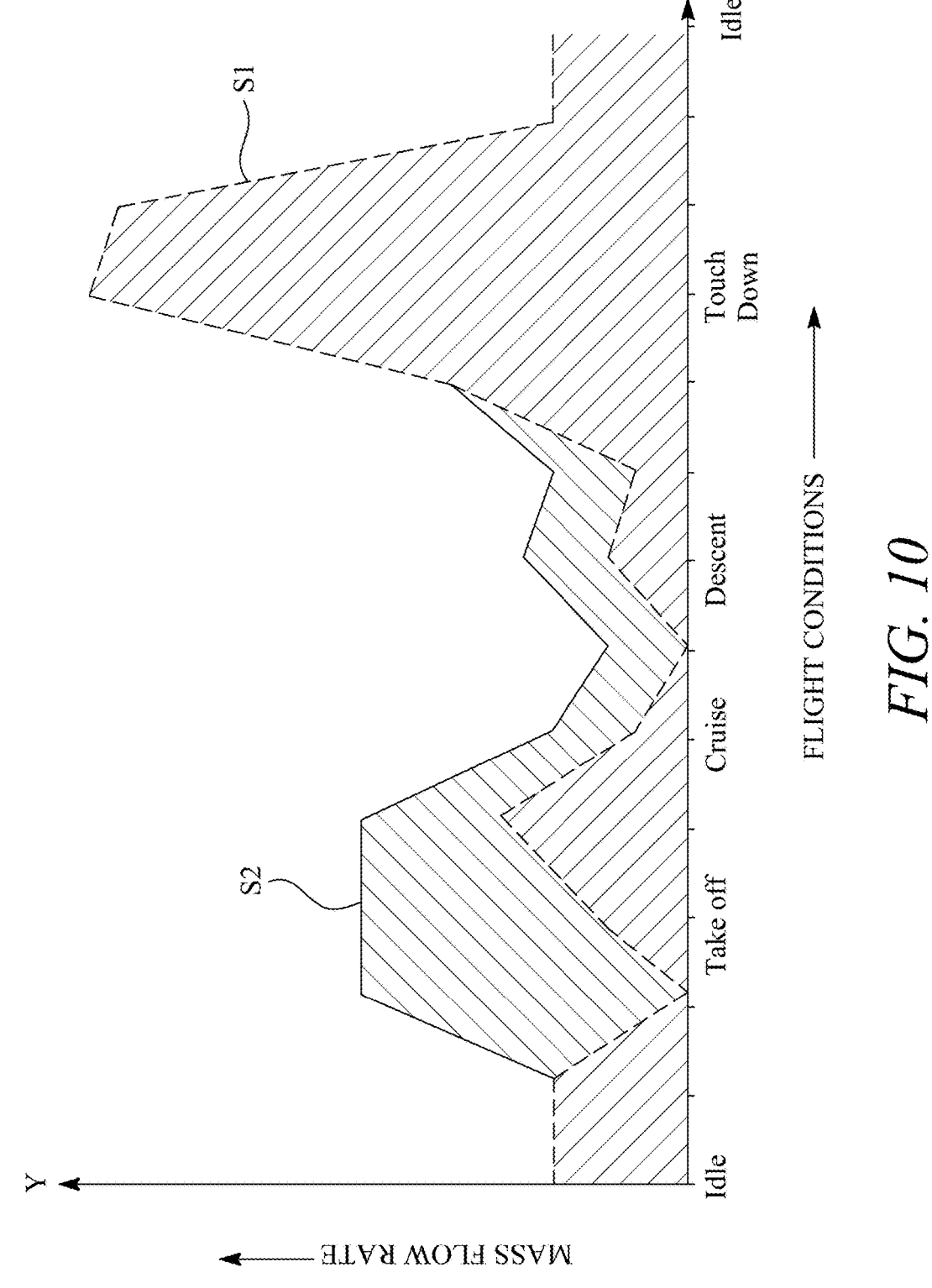
FIG. 10 illustrates a plot depicting mass flow rates of cooling airflow flowing towards the core zone cooling arrangement and the turbine case cooling arrangement during a flight cycle, as per conventional systems.

FIG. 10 illustrates an exemplary plot 1000 depicting mass flow rates of cooling airflow (similar to the airflow F1) flowing towards the core zone cooling arrangement 106 (see FIG. 2) and the turbine case cooling arrangement 110 (see FIG. 2) during a flight cycle, according to conventional systems. Various values for mass flow rates are marked on the Y-axis and various flight conditions, such as an idle condition, a take-off condition, a cruise condition, a descent condition, and a touch-down condition during the flight cycle are marked on the X-axis. The plot 1000 depicts a curve S1. The curve S1 is plotted based on mass flow rates of the cooling airflow towards the core zone cooling arrangement 106 during different flight conditions. Further, the plot 1000 depicts a curve S2. The curve S2 is plotted based on mass flow rates of the cooling airflow towards the turbine cooling arrangement 110 during different flight conditions. From the plot 1000, it can be observed that during the take-off condition, higher amounts of the cooling airflow is directed towards the turbine case cooling arrangement 110. Since, minimum or no cooling airflow may be required by the turbine case cooling arrangement 110 during the take-off condition, the cooling airflow may be directed towards the core zone cooling arrangement 106 instead that requires higher amounts of the cooling airflow during the take-off condition.

Further, referring to FIGS. 2, 3, and 10, based on the incorporation of the system 100, the airflow F2 will be directed towards the core zone cooling arrangement 106 instead of the turbine case cooling arrangement 110. Accordingly, the controller 136 of the system 100 may be programmed to transmit the control signal C1 to the valve unit 120 to operate the valve unit 120 in the first configuration A1, such that the first valve member 122 moves to the fully open position to allow the cooling airflow to flow towards the core zone cooling arrangement 106. Further, it should be noted that, if the turbine case cooling arrangement 110 does not require cooling air at any other engine conditions, the controller 136 may be programmed to operate the valve unit 120 in the first configuration A1, so that some portion of the airflow F1 may be directed towards the core zone cooling arrangement 106, so that the first fixed flow duct 116 may have smaller dimensions.

Figure 11:
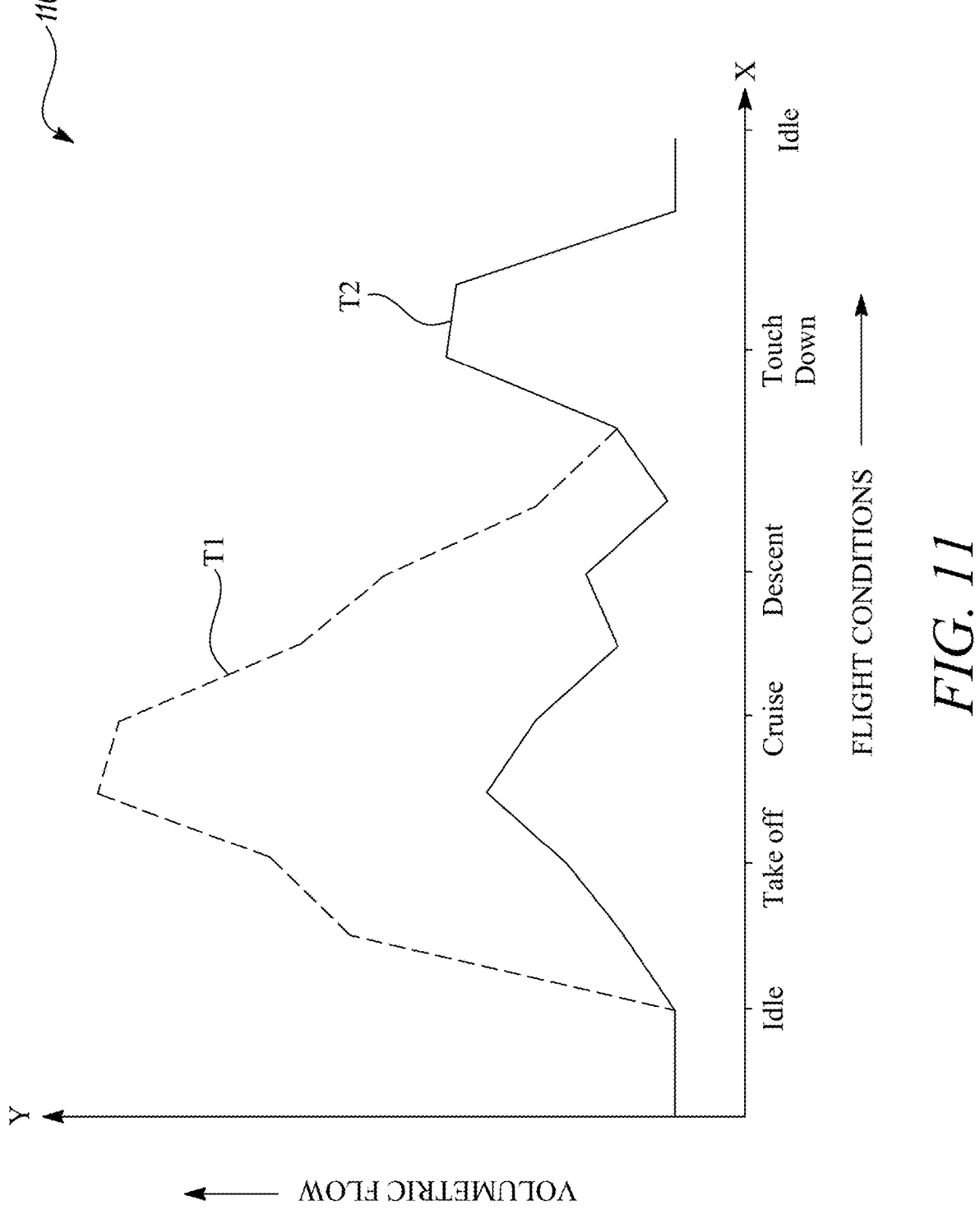
FIG. 11 illustrates a plot depicting volumetric flow of cooling airflow flowing towards the core zone cooling arrangement during a flight cycle, according to conventional systems and after incorporation of the system of the present disclosure.

FIG. 11 illustrates an exemplary plot 1100 depicting volumetric flow of cooling airflow (similar to the airflow F1) flowing towards the core zone cooling arrangement 106 (see FIG. 2) during a flight cycle, according to conventional systems and after incorporation of the system 100 (see FIGS.

2 to 5) of the present disclosure. Various values for the volumetric flow are marked on the Y-axis and various flight conditions, such as the idle condition, the take-off condition, the cruise condition, the descent condition, and the touchdown condition during the flight cycle are marked on the X-axis. The plot 1100 depicts a curve T1. The curve T1 is plotted based on volumetric flow of the cooling airflow towards the core zone cooling arrangement 106 (see FIG. 2) during different flight conditions, as per conventional systems. Further, the plot 1100 also depicts a curve T2. The curve T2 is plotted based on volumetric flow of the cooling airflow towards the core zone cooling arrangement 106 during different flight conditions after incorporating the system 100. From the curve T1, it can be observed that the core zone cooling arrangement 106 receives higher amounts of the cooling airflow during the cruise condition.

Further, referring to FIGS. 2, 3, 4, and 11, since minimum or no cooling airflow may be required by the core zone cooling arrangement 106 during cruise conditions, therefore, the controller 136 may transmit the control signal C2 to the valve unit 120 to operate the valve unit 120 in the second configuration A2, such that the second valve member 124 moves to the fully open position to allow the cooling airflow to flow towards the turbine case cooling arrangement 110. From the curves T1, T2, it can be observed that the volumetric flow towards the core zone cooling arrangement 106 during cruise conditions after incorporation of the system 100 is lesser than the volumetric flow towards the core zone cooling arrangement 106 during cruise conditions as per conventional systems, as higher amounts of the cooling airflow will be directed towards the turbine case cooling arrangement 110 after incorporation of the system 100. Accordingly, less amounts of air flow F1 may be drawn from the bypass duct 22 (see FIG. 1) as the core zone ventilation arrangement 106 is not provided with excess amounts of cooling air flow, when not necessary.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A system for cooling one or more components associated with a gas turbine engine, the system comprising:
   a main duct configured to receive an airflow for cooling the one or more components associated with the gas turbine engine;
   a first duct disposed in fluid communication with the main duct, wherein the first duct is configured to receive and direct a portion of the airflow from the main duct towards a core zone cooling arrangement of the gas turbine engine;
   a second duct separate from the first duct and disposed in fluid communication with the main duct, wherein the second duct is configured to receive and direct a portion of the airflow from the main duct towards at least one of a turbine case cooling arrangement of the gas turbine engine and an oil cooling unit of the gas turbine engine;
   a valve unit including a first valve member disposed in the first duct and a second valve member disposed in the second duct, wherein the first valve member is configured to control a fluid flow through the first duct, and wherein the second valve member is configured to control a fluid flow through the second duct; and at least one controller communicably coupled with the valve unit, wherein the at least one controller is configured to control the valve unit to modulate the portion of the airflow through each of the first duct and the second duct,
wherein the first valve member and the second valve member are mechanically connected such that the at least one controller simultaneously actuates both of the first valve member and the second valve member.

2. The system of claim 1, wherein the valve unit includes a three-way valve configured to modulate the portion of the airflow through each of the first duct and the second duct.

3. The system of claim 2, wherein the valve unit includes the first valve member, the second valve member, and a connecting rod assembly that connects the first valve member with the second valve member.

4. The system of claim 3, wherein:
   the first duct is inclined to the second duct by an inclination angle;
   the at least one controller controls one of the first valve member and the second valve member; and
   the other of the first valve member and the second valve member is actuated by the connecting rod assembly based on an actuation of the one of the first valve member and the second valve member by the at least one controller, such that:
   in a first configuration of the valve unit, the first valve member is fully open to allow the fluid flow through the first duct and the second valve member is fully closed to block the fluid flow through the second duct;
   in a second configuration of the valve unit, the first valve member is fully closed to block the fluid flow through the first duct and the second valve member is fully open to allow the fluid flow through the second duct; and
   in a third configuration of the valve unit, each of the first valve member and the second valve member is partially open.

5. The system of claim 4, wherein the connecting rod assembly includes a first rod pivotally connected to the first valve member, a second rod pivotally connected to the second valve member, and a main rod pivotally connected to each of the first rod and the second rod.

6. The system of claim 3, wherein the connecting rod assembly includes a first rod pivotally connected to the first valve member, a second rod pivotally connected to the second valve member, and a main rod pivotally connected to each of the first rod and the second rod.

7. The system of claim 1, wherein the at least one controller includes a first controller and a second controller, wherein the first controller is configured to control the valve unit based on a cooling requirement of the core zone cooling arrangement, and wherein the second controller is configured to control the valve unit based on a cooling requirement of at least one of the turbine case cooling arrangement and the oil cooling unit.

8. The system of claim 1, wherein:
   the valve unit includes a first valve including the first valve member and a second valve including the second valve member separate from the first valve, and wherein each of the first valve and the second valve includes a two-way valve, or
   the at least one controller includes:
   a single controller configured to control each of the first valve based on a cooling requirement of the core zone cooling arrangement and the second valve based on a cooling requirement of at least one of the turbine case cooling arrangement and the oil cooling unit, or a first controller and a second controller, wherein the first controller is configured to control the first valve based on the cooling requirement of the core zone cooling arrangement, and wherein the second controller is configured to control the second valve based on the cooling requirement of at least one of the turbine case cooling arrangement and the oil cooling unit.

9. The system of claim 1, wherein the main duct is in fluid communication with at least one of a bypass duct of the gas turbine engine, a compressor of the gas turbine engine, and a cabin blower unit associated with the gas turbine engine to receive the airflow.

10. The system of claim 1, further including at least one first fixed flow duct separate from each of the first duct and the second duct and disposed in fluid communication with a first main duct and the core zone cooling arrangement, wherein the at least one first fixed flow duct is configured to receive and direct a fixed amount of airflow from the first main duct towards the core zone cooling arrangement.

11. The system of claim 1, further including at least one second fixed flow duct separate from each of the first duct and the second duct and disposed in fluid communication with a second main duct and at least one of the turbine case cooling arrangement and the oil cooling unit, wherein the at least one second fixed flow duct is configured to receive and direct a fixed amount of airflow from the second main duct towards at least one of the turbine case cooling arrangement and the oil cooling unit.

12. The system of claim 1, wherein the at least one controller opens one of the first valve member and the second valve member a same amount by which the other of the first valve member and the second valve member is closed because of the mechanical connection between the first valve member and the second valve member.

13. A gas turbine engine comprising:

an engine core comprising a compressor, a combustor, a turbine and a core shaft connecting the turbine to the compressor;

a fan located upstream of the engine core; and a system for cooling one or more components associated with the gas turbine engine, the system comprising:

a main duct configured to receive an airflow for cooling the one or more components associated with the gas turbine engine;

a first duct disposed in fluid communication with the main duct, wherein the first duct is configured to receive and direct a portion of the airflow from the main duct towards a core zone cooling arrangement of the gas turbine engine;

a second duct separate from the first duct and disposed in fluid communication with the main duct, wherein the second duct is configured to receive and direct a portion of the airflow from the main duct towards at least one of a turbine case cooling arrangement of the gas turbine engine and an oil cooling unit of the gas turbine engine;

a valve unit including a first valve member disposed in the first duct and a second valve member disposed in the second duct, wherein the first valve member is configured to control a fluid flow through the first duct, and wherein the second valve member is configured to control a fluid flow through the second duct; and at least one controller communicably coupled with the valve unit, wherein the at least one controller is configured to control the valve unit to modulate the portion of the airflow through each of the first duct and the second duct, wherein the first valve member and the second valve member are mechanically connected such that the at least one controller simultaneously actuates both of the first valve member and the second valve member.

14. The gas turbine engine of claim 13, further including a gearbox configured to receive an input from the core shaft output drive to the fan so as to drive the fan at a lower rotational speed than the core shaft, wherein:

the compressor is a first compressor, the turbine is a first turbine, and the core shaft is a first core shaft, and the engine core further comprises a second compressor, a second turbine, and a second core shaft, the second compressor, second turbine and second core shaft are arranged to rotate at a higher rotational speed than the first core shaft.

15. The gas turbine engine of claim 14, wherein the at least one controller includes a single controller configured to control the valve unit based on a cooling requirement of the core zone cooling arrangement and a cooling requirement of at least one of the turbine case cooling arrangement and the oil cooling unit.

16. The gas turbine engine of claim 14, wherein the at least one controller includes a first controller and a second controller, wherein the first controller is configured to control the valve unit based on a cooling requirement of the core zone cooling arrangement, and wherein the second controller is configured to control the valve unit based on a cooling requirement of at least one of the turbine case cooling arrangement and the oil cooling unit.

17. The gas turbine of claim 14, further comprising a nacelle defining a bypass duct of the gas turbine engine.

18. The gas turbine engine of claim 13, wherein:

the valve unit includes a three-way valve configured to modulate the portion of the airflow through each of the first duct and the second duct, the valve unit includes the first valve member, the second valve member, and a connecting rod assembly that connects the first valve member with the second valve member, the first duct is inclined to the second duct by an inclination angle, the at least one controller controls one of the first valve member and the second valve member, and the other of the first valve member and the second valve member is actuated by the connecting rod assembly based on an actuation of the one of the first valve member and the second valve member by the at least one controller, such that:

in a first configuration of the valve unit, the first valve member is fully open to allow the fluid flow through the first duct and the second valve member is fully closed to block the fluid flow through the second duct, in a second configuration of the valve unit, the first valve member is fully closed to block the fluid flow through the first duct and the second valve member is fully open to allow the fluid flow through the second duct, and in a third configuration of the valve unit, each of the first valve member and the second valve member is partially open.

19. The gas turbine engine of claim 13, wherein the at least one controller opens one of the first valve member and the second valve member a same amount by which the other of the first valve member and the second valve member is closed because of the mechanical connection between the first valve member and the second valve member.

20. A system for cooling one or more components associated with a gas turbine engine, the system comprising:

a main duct configured to receive an airflow for cooling the one or more components associated with the gas turbine engine;

a first duct disposed in fluid communication with the main duct, wherein the first duct is configured to receive and direct a portion of the airflow from the main duct towards a core zone cooling arrangement of the gas turbine engine;

a second duct separate from the first duct and disposed in fluid communication with the main duct, wherein the second duct is configured to receive and direct a portion of the airflow from the main duct towards at least one of a turbine case cooling arrangement of the gas turbine engine and an oil cooling unit of the gas turbine engine;

a valve unit including a first valve member disposed in the first duct and a second valve member disposed in the second duct, wherein the first valve member is configured to control a fluid flow through the first duct, and wherein the second valve member is configured to control a fluid flow through the second duct; and at least one controller communicably coupled with the valve unit, wherein the at least one controller is configured to control the valve unit to modulate the portion of the airflow through each of the first duct and the second duct, wherein:

the valve unit includes a three-way valve configured to modulate the portion of the airflow through each of the first duct and the second duct, the valve unit includes the first valve member, the second valve member, and a connecting rod assembly that connects the first valve member with the second valve member, the first duct is inclined to the second duct by an inclination angle, the at least one controller controls one of the first valve member and the second valve member, and the other of the first valve member and the second valve member is actuated by the connecting rod assembly based on an actuation of the one of the first valve member and the second valve member by the at least one controller, such that:

in a first configuration of the valve unit, the first valve member is fully open to allow the fluid flow through the first duct and the second valve member is fully closed to block the fluid flow through the second duct, in a second configuration of the valve unit, the first valve member is fully closed to block the fluid flow through the first duct and the second valve member is fully open to allow the fluid flow through the second duct, and in a third configuration of the valve unit, each of the first valve member and the second valve member is partially open.

* * * * *